United States Patent
Abe

(10) Patent No.: US 11,972,900 B2
(45) Date of Patent: Apr. 30, 2024

(54) MULTILAYER CERAMIC CAPACITOR

(71) Applicant: Murata Manufacturing Co., Ltd., Nagaokakyo (JP)

(72) Inventor: Yoshiyuki Abe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 37 days.

(21) Appl. No.: 17/668,411

(22) Filed: Feb. 10, 2022

(65) Prior Publication Data
US 2022/0270820 A1    Aug. 25, 2022

(30) Foreign Application Priority Data

Feb. 24, 2021 (JP) .................... 2021-027237

(51) Int. Cl.
*H01G 2/00* (2006.01)
*H01G 4/008* (2006.01)
*H01G 4/12* (2006.01)
*H01G 4/232* (2006.01)
*H01G 4/248* (2006.01)
*H01G 4/30* (2006.01)

(52) U.S. Cl.
CPC ............ *H01G 2/00* (2013.01); *H01G 4/2325* (2013.01); *H01G 4/248* (2013.01); *H01G 4/30* (2013.01); *H01G 4/008* (2013.01); *H01G 4/1227* (2013.01); *H01G 4/1245* (2013.01)

(58) Field of Classification Search
CPC ........ H01G 2/00; H01G 4/2325; H01G 4/248; H01G 4/30; H01G 2/065; H01G 4/008; H01G 4/012; H01G 4/1218; H01G 4/232; H01G 4/1227; H01G 4/1245
See application file for complete search history.

(56) References Cited

U.S. PATENT DOCUMENTS

| | | | |
|---|---|---|---|
| 2008/0112109 A1* | 5/2008 | Muto | H01G 4/1245 361/301.4 |
| 2011/0102971 A1* | 5/2011 | Itamura | H01G 4/30 361/321.2 |
| 2013/0294010 A1* | 11/2013 | Lee | H01G 4/30 29/25.42 |
| 2015/0016014 A1* | 1/2015 | Park | H01G 2/065 156/89.12 |
| 2017/0162326 A1* | 6/2017 | Kowase | H01G 4/012 |
| 2017/0162330 A1* | 6/2017 | Kan | H01G 4/012 |
| 2019/0318874 A1* | 10/2019 | Orimo | H05K 1/181 |

FOREIGN PATENT DOCUMENTS

JP    2015-29009 A    2/2015

* cited by examiner

*Primary Examiner* — Michael P McFadden
(74) *Attorney, Agent, or Firm* — Keating & Bennett, LLP

(57) ABSTRACT

A multilayer ceramic capacitor includes a multilayer body including dielectric layers and internal electrode layers alternately laminated therein, first and second main surfaces opposing each other in a lamination direction, first and second end surfaces opposing each other in a length direction which intersects the lamination direction, and first and second side surfaces opposing each other in a width direction which intersects the lamination direction and the length direction, and external electrodes on the first and second end surfaces, and each electrically connected to the internal electrode layers, wherein the multilayer body includes a slit in at least one of the first side surface, the second side surface, and the second main surface defining and functioning as a board-mounting surface.

15 Claims, 8 Drawing Sheets

MULTILAYER CERAMIC CAPACITOR

CROSS REFERENCE TO RELATED APPLICATIONS

This application claims the benefit of priority to Japanese Patent Application No. 2021-027237 filed on Feb. 24, 2021. The entire contents of this application are hereby incorporated herein by reference.

BACKGROUND OF THE INVENTION

1. Field of the Invention

The present disclosure relates to a multilayer ceramic capacitor.

2. Description of the Related Art

When deflection stress such as bending is applied to a board while a multilayer ceramic capacitor is mounted thereon, cracks may occur at the end of an external electrode in the vicinity of the board mounting surface of the multilayer ceramic capacitor.

Conventionally, in order to reduce or prevent such cracks, a technology has been disclosed which provides a resin portion covering a portion of the surface of the external electrode and the surface of the multilayer body, and a plated layer directly covering the remaining portion of the portion covered by the resin portion, of the surface of the external electrode (refer to Japanese Unexamined Patent Application, Publication No. 2015-29009).

However, the above technology may make the electrode structure complicated, and increase ESR (equivalent series resistance).

SUMMARY OF THE INVENTION

Preferred embodiments of the present invention provide multilayer ceramic capacitors each of which includes a simple structure without increasing ESR, and in each of which cracks are less likely to occur even when stress such as bending is applied to the board.

A preferred embodiment of the present invention provides a multilayer ceramic capacitor including a multilayer body including a plurality of dielectric layers and a plurality of internal electrode layers alternately laminated therein, the multilayer body further including a first main surface and a second main surface opposing each other in a lamination direction, a first end surface and a second end surface opposing each other in a length direction which intersects the lamination direction, and a first side surface and a second side surface opposing each other in a width direction which intersects the lamination direction and the length direction, and external electrodes respectively provided on the first end surface and the second end surface of the multilayer body, and each electrically connected to the internal electrode layers, wherein the multilayer body includes a slit in at least one of the first side surface, the second side surface, and the second main surface, which defines and functions as a board-mounting surface, of the first main surface and second main surface.

According to preferred embodiments of the present disclosure, it is possible to provide multilayer ceramic capacitors each of which includes a simple structure without increasing ESR, and in each of which cracks are less likely to occur even when stress such as bending is applied to the board.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

Figure 1:
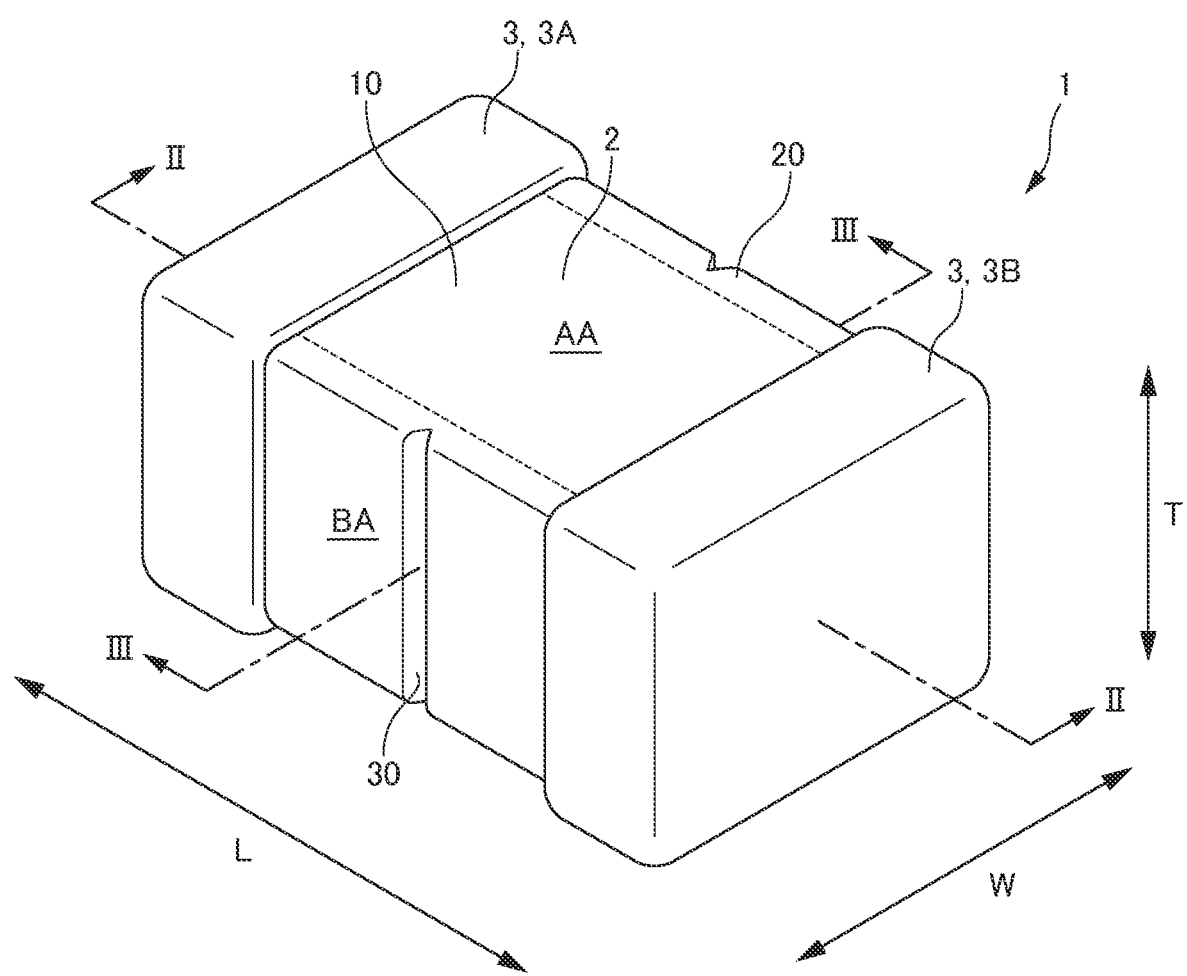
FIG. 1 is a schematic perspective view of a multilayer ceramic capacitor 1 according to a preferred embodiment of the present invention.
Figure 2:
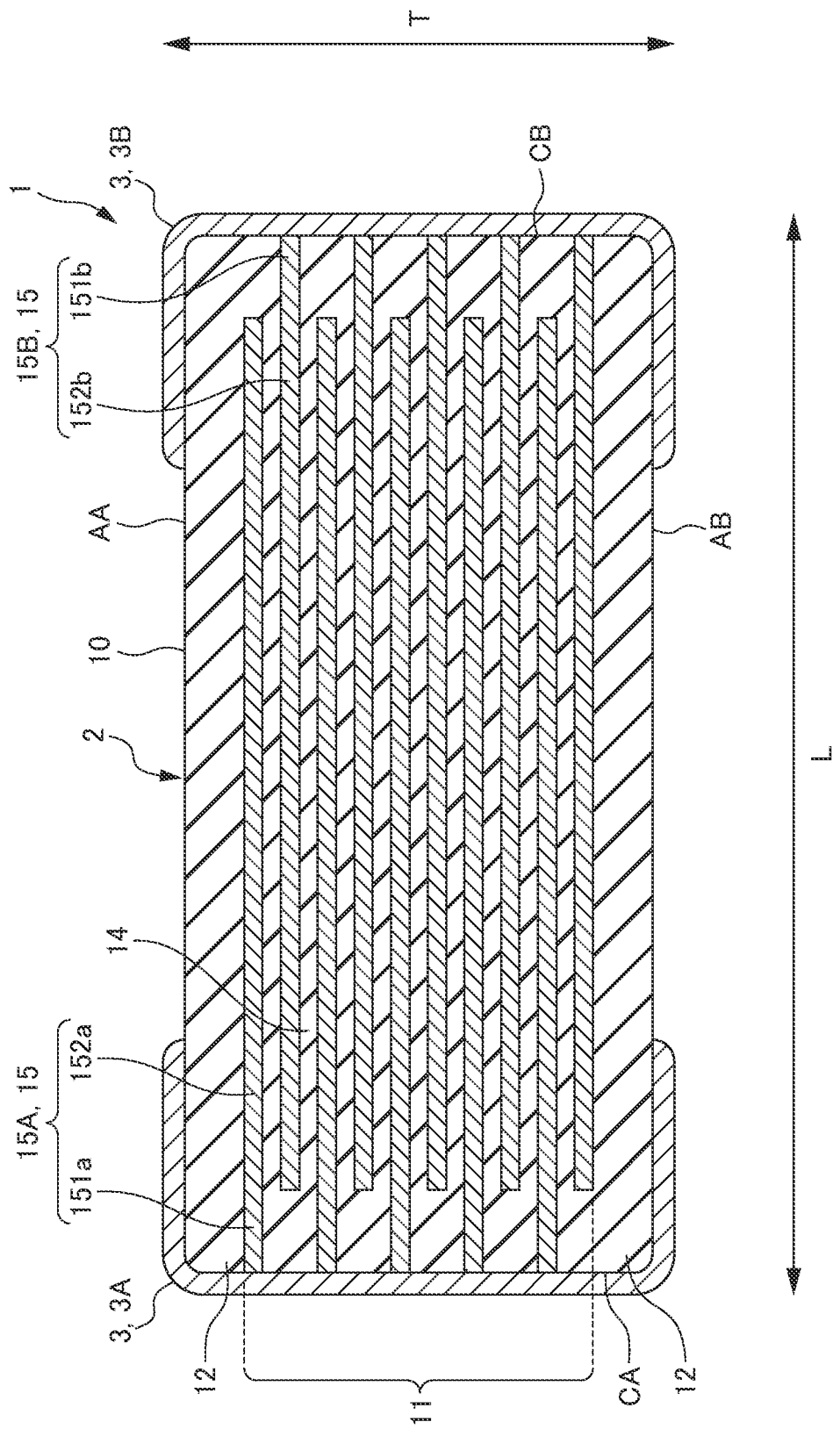
FIG. 2 is a cross-sectional view taken along the line II-II of the multilayer ceramic capacitor 1 shown in FIG. 1.
Figure 3A:
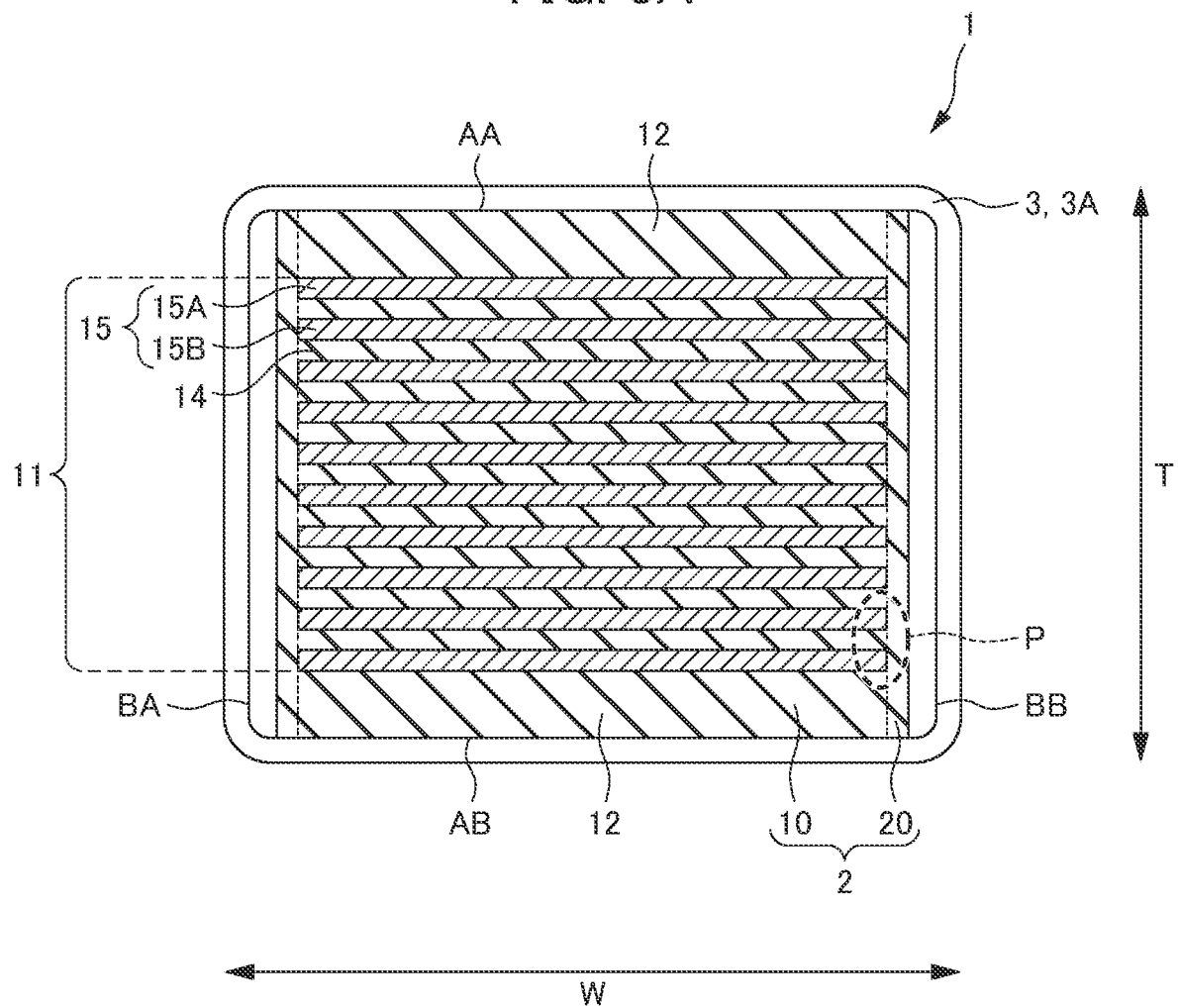
FIG. 3A is a cross-sectional view taken along the line III-III of the multilayer ceramic capacitor 1 in FIG. 1.
Figure 3B:
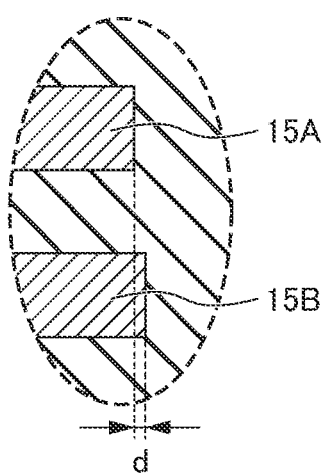
FIG. 3B is an enlarged view of the portion P of FIG. 3A.

A multilayer ceramic capacitor 1 according to a preferred embodiment of the present invention will be described below. FIG. 1 is a schematic perspective view of the multilayer ceramic capacitor 1 according to a preferred embodiment of the present invention. FIG. 2 is a cross-sectional view taken along the line II-II of the multilayer ceramic capacitor 1 shown in FIG. 1. FIGS. 3A and 3B are cross-sectional views taken along the line III-III of the multilayer ceramic capacitor 1 in FIG. 1.

Multilayer Ceramic Capacitor 1

The multilayer ceramic capacitor 1 has a rectangular or substantially rectangular parallelepiped shape, and includes a multilayer body 2, and a pair of external electrodes 3 provided at both ends of the multilayer body 2. The multilayer body 2 includes an inner layer portion 11 in which a plurality of dielectric layers 14 and a plurality of internal electrode layers 15 are laminated.

In the following description, as terms representing the orientations of the multilayer ceramic capacitor 1, a direction in which the pair of external electrodes 3 are provided is defined as a length direction L. A direction in which the dielectric layers 14 and the internal electrode layers 15 are laminated (stacked) is defined as a lamination (stacking) direction T. A direction intersecting both the length direction L and the lamination direction T is defined as a width direction W.

In the present preferred embodiment, the width direction W is perpendicular or substantially perpendicular to both the length direction L and the lamination direction T.

Furthermore, in the following description, among the six outer peripheral surfaces of the multilayer body 2 shown in FIG. 2, a pair of outer surfaces opposing in the lamination direction T are defined as a first main surface AA and a second main surface AB, a pair of outer surfaces opposing in the width direction W are defined as a first side surface BA and a second side surface BB, and a pair of outer surfaces opposing each other in the length direction L are defined as a first end surface CA and a second end surface CB.

In a case in which it is not necessary to particularly distinguish between the first main surface AA and the second main surface AB from each other, they are collectively referred to as a main surface A, in a case in which it is not necessary to particularly distinguish between the first side surface BA and the second side surface BB from each other, they are collectively referred to as a side surface B, and in a case in which it is not necessary to particularly distinguish between the first end surface CA and the second end surface CB from each other, they are collectively referred to as an end surface C.

Multilayer Body 2

The multilayer body 2 includes a laminate chip 10, and a side gap portion 20.

Laminated Chip 10

The laminate chip 10 includes the inner layer portion 11, and outer layer portions 12 disposed on both sides of the inner layer portion 11 in the vicinity of the main surface A.

Inner Layer Portion 11

The inner layer portion 11 includes the plurality of dielectric layers 14 and the plurality of internal electrode layers 15 laminated therein.

Dielectric Layer 14

The dielectric layer 14 is made of a ceramic material including, for example, Ba and Ti, the internal electrode layer 15 includes, for example, Ni and thus the multilayer ceramic capacitor 1 according to a preferred embodiment is directed to a TC-based capacitor.

However, the present disclosure is not limited thereto, and the dielectric layers 14 may be made of, for example, a ceramic material including Ca, Zr, and Ti, and thus the internal electrode layers 15 may be directed to a barium titanate-based capacitor including Cu.

Internal Electrode Layer 15

The internal electrode layers 15 include a plurality of first internal electrode layers 15A and a plurality of second internal electrode layers 15B. The first internal electrode layers 15A and the second internal electrode layers 15B are alternately provided. When it is not necessary to particularly distinguish between the first internal electrode layer 15A and the second internal electrode layer 15B, they will be collectively referred to as an internal electrode layer 15.

The first internal electrode layer 15A includes a first opposing portion 152a facing the second internal electrode layer 15B, and a first lead-out portion 151a extending from the first opposing portion 152a toward the first end surface CA. The first lead-out portion 151a includes an end portion which is exposed at the first end surface CA, and is electrically connected to a first external electrode 3A, which will be described later.

The second internal electrode layer 15B includes a second opposing portion 152b facing the first internal electrode layer 15A, and a second lead-out portion 151b extending from the second opposing portion 152b toward the second end surface CB. The end portion of the second lead-out portion 151b is electrically connected to the second external electrode 3B, which will be described later.

According to the internal electrode layer 15 described above, charges are accumulated in the first opposing portion 152a of the first internal electrode layer 15A and the second opposing portion 152b of the second internal electrode layer 15B, such that the characteristics of the capacitor are obtained.

FIG. 3B is an enlarged view of the portion P in FIG. 3A. In the WT cross-section shown in FIG. 3B, which is a cross-section in the lamination direction T and the width direction passing through the center or approximate center of the multilayer body 2, the deviation d in the lamination direction T of the end portions in the width direction W between the first internal electrode layer 15A and the second internal electrode layer 15B which are adjacent to each other vertically in the lamination direction T is within about 0.5 µm, for example. That is, the end portions in the width direction W between the first internal electrode layer 15A and the second internal electrode layer 15B, which are adjacent vertically in the lamination direction T, are at the same or substantially at the same position in the width direction W, and thus the positions of the end portions are aligned in the lamination direction T.

Outer Layer Portion 12

The outer layer portions 12 are each made of the same dielectric ceramic material as the dielectric layer 14 of the inner layer portion 11.

Side Gap Portion 20

The side gap portions 20 are provided in the vicinity of both side surfaces B where the inner layer portion 11 and the outer layer portions 12 are laminated. The side gap portions 20 each cover the end portions in the width direction W of the internal electrode layers 15 exposed at both sides of the laminate chip 10, along these ends. The side gap portions 20 are each made of the same dielectric ceramic material as the dielectric layer 14.

External Electrode 3

The external electrodes 3 include a first external electrode 3A provided on the first end surface CA of the multilayer body 2, and a second external electrode 3B provided on the second end surface CB of the multilayer body 2. When it is not necessary to particularly distinguish between the first external electrode 3A and the second external electrode 3B, they will be collectively referred to as the external electrode 3. The external electrode 3 covers not only the end surface C, but also covers portions of the main surface A and the side surface B which are adjacent to or in the vicinity of the end surface C.

The external electrode 3 is formed, for example, by sintering a Cu paste including glass including Ba (barium) and silica, and is a post-fired electrode separately fired after the firing of the multilayer body 2.

Slit 30

Figure 4A:
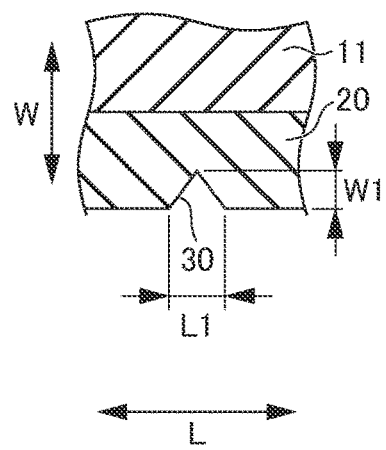
FIG. 4A provides partially enlarged views, each showing an LW cross section including a slit 30 passing through the length direction L and the width direction W.
Figure 4B:
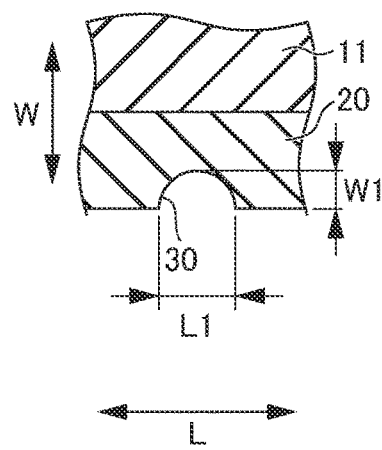
FIG. 4B shows modified examples of FIG. 4A.
Figure 4C:
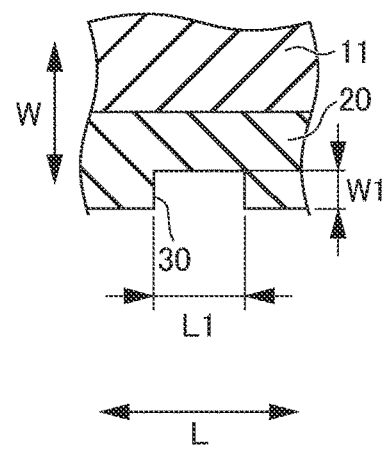
FIG. 4C shows modified examples of FIG. 4A.

In the present preferred embodiment, as shown in FIG. 1 and FIG. 3, slits 30 are provided in a central portion of the first side surface BA and the second side surface BB in the length direction L. FIGS. 4A to 4C provide partially enlarged views, each showing an LW cross-section including the slit 30 passing through the length direction L and the width direction W.

FIG. 4A shows a preferred embodiment of the present invention, with FIGS. 4B and 4C each show modified examples of a preferred embodiment of the present invention.

The slits 30 of the present preferred embodiment of FIG. 4A each have a triangular or substantially triangular LW cross-section. Furthermore, the slits 30 are provided over the entire or substantially the entire dimension in the lamination direction T in the first side surface BA and the second side surface BB.

However, the present preferred embodiment is not limited thereto. FIGS. 4B and 4C each show a modified example of the slit 30 in the LW cross-section. The LW cross-section of the slit 30 may have a semicircular, a substantially semicircular, a semi-elliptical, or a substantially semi-elliptical shape as shown in FIG. 4B, or may have a rectangular or substantially rectangular shape as shown in FIG. 4C. Furthermore, the slit 30 in the LW cross-section is not limited to these modified examples, and may have other suitable shapes.

In addition, when the size of the multilayer ceramic capacitor 1 is, for example, about 0.1 mm to about 3.2 mm in the length direction L, about 0.05 mm to about 2.5 mm in the lamination direction T, and about 0.05 mm to about 3.2 mm in the width direction W, the width L1 of the slit 30 shown in FIG. 4 is preferably, for example, about 0.001 mm to about 0.1 mm, and the depth W1 is preferably, for example, less than about 50% of the dimension of the side surface BA or the side surface BB.

Figure 5A:
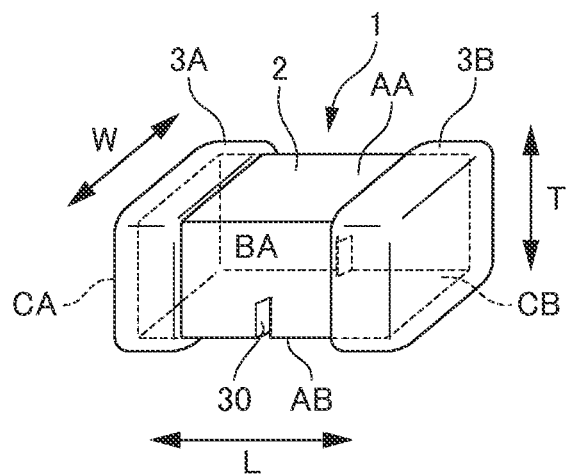
FIG. 5A provides diagrams showing other modified examples of the slit 30.

FIGS. 5A to 5D provide diagrams showing other modified examples of the slit 30. The slit 30 may not be provided over the entire or substantially the entire dimension extending in the lamination direction T in the first side surface BA or the second side surface BB, and may be provided in a portion extending in the lamination direction T on the second main surface AB as shown in FIG. 5A.

Furthermore, the slit 30 may be provided in the second main surface AB.

Figure 5B:
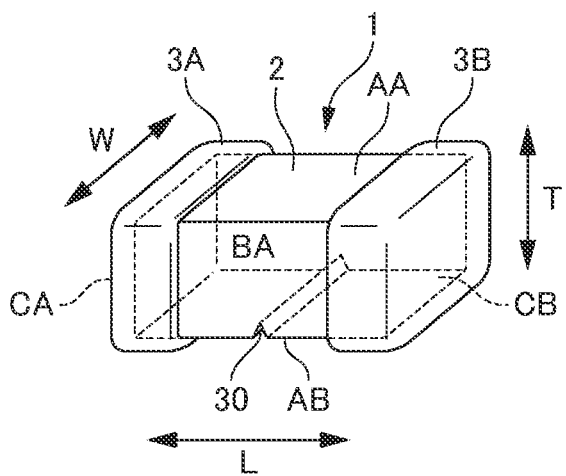
FIG. 5B provides diagrams showing other modified examples of the slit 30.

FIG. 5B shows an example in which the slit 30 is provided over the entire or substantially the entire dimension extending in the width direction W in the middle portion in the length direction L on the second main surface AB.

Figure 5C:
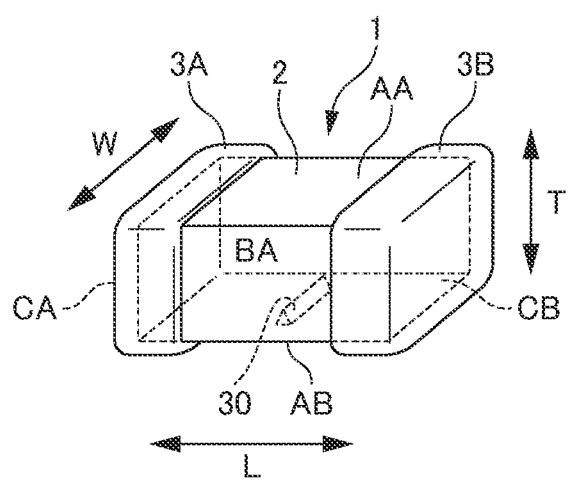
FIG. 5C provides diagrams showing other modified examples of the slit 30.

FIG. 5C shows an example in which the slit 30 is provided at a central portion extending in the width direction W, in the central portion in the length direction L on the second main surface AB.

Figure 5D:
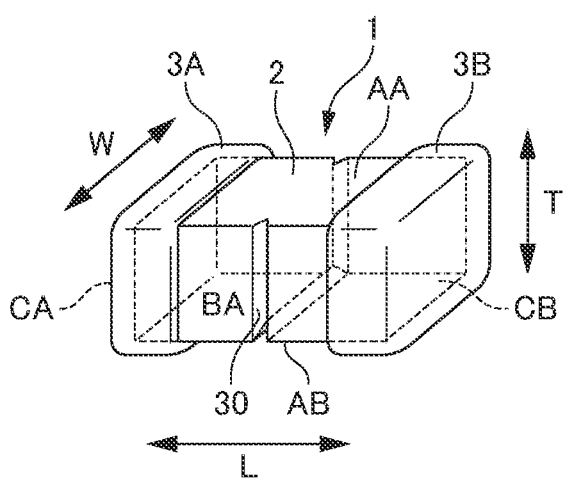
FIG. 5D provides diagrams showing other modified examples of the slit 30.

FIG. 5D shows an example in which the slit 30 is provided over the entire or substantially the entire dimension extending in the lamination direction T of the first side surface BA and the second side surface BB in the central portion in the length direction L, and over the entire or substantially the entire dimension extending in the width direction W of the second main surface AB in the central portion in the length direction L.

Method of Manufacturing Multilayer Ceramic Capacitor 1

Figure 6:
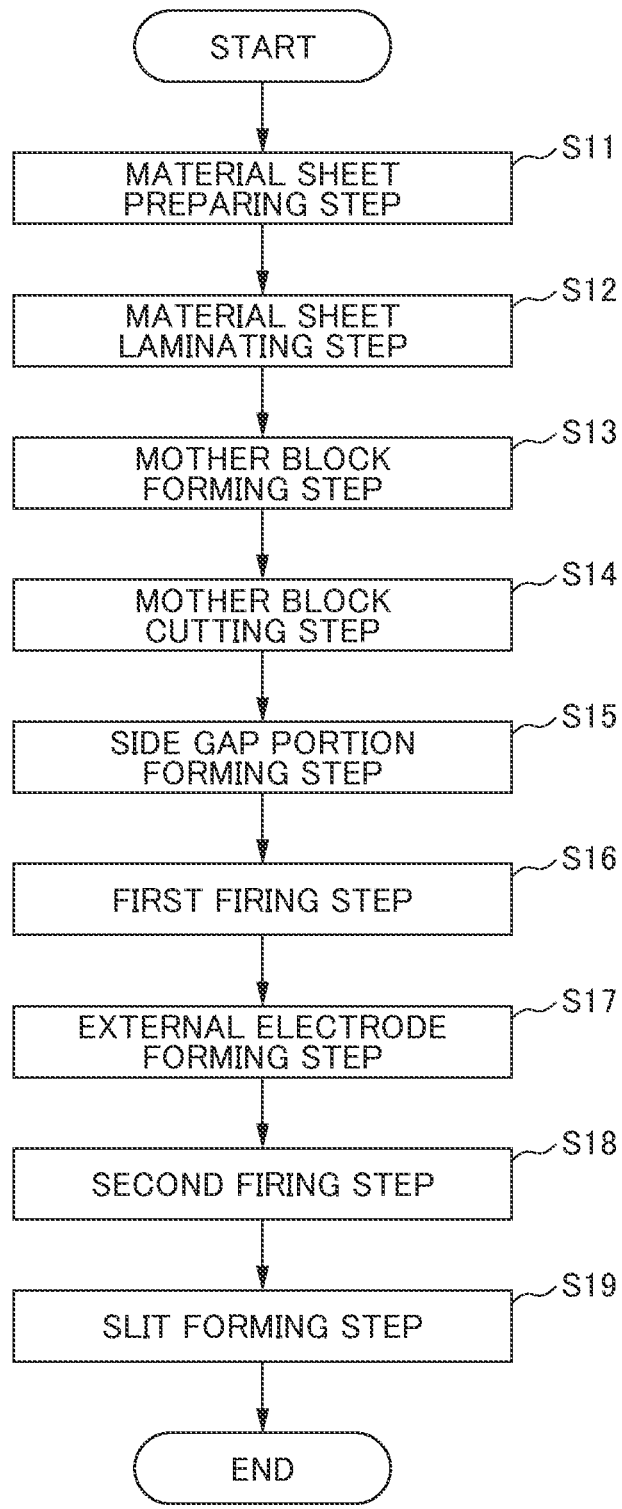
FIG. 6 is a flowchart explaining a non-limiting example of a method of manufacturing the multilayer ceramic capacitor 1.

FIG. 6 provides a flowchart showing a non-limiting example of a method of manufacturing the multilayer ceramic capacitor 1. FIGS. 7A to 7F provide diagrams for explaining a non-limiting example of a method of manufacturing the multilayer ceramic capacitor 1.

The non-limiting example of a method of manufacturing the multilayer ceramic capacitor 1 includes a material sheet preparing step S11, a material sheet laminating step S12, a mother block forming step S13, a mother block cutting step S14, a side gap portion forming step S15, a first firing step S16, an etching step S17, an external electrode forming step S18, a second firing step S19, and a slit forming step S20.

Material Sheet Preparing Step S11

Ceramic powders and ceramic slurries including a binder and a solvent are prepared. The ceramic slurries are formed into a sheet shape on a carrier film using a die coater, a gravure coater, a micro gravure coater or the like, for example, such that inner layer portion ceramic green sheets 101 are manufactured.

Furthermore, an outer layer portion ceramic green sheet 112 defining and functioning as the outer layer portion 12 is also manufactured in the same or substantially the same manner.

Subsequently, the inner layer portion ceramic green sheets 101 are subjected to screen printing, ink jet printing, gravure printing or the like, for example, so that conductive pastes 102 each have a strip-shaped pattern.

Thus, each of the material sheets 103 is prepared on which the conductive paste 102 defining and functioning as the internal electrode layer 15 is printed on the surface of the inner layer portion ceramic green sheet 101 defining and functioning as the dielectric layer 14.

Material Sheet Laminating Step S12

Figure 7A:
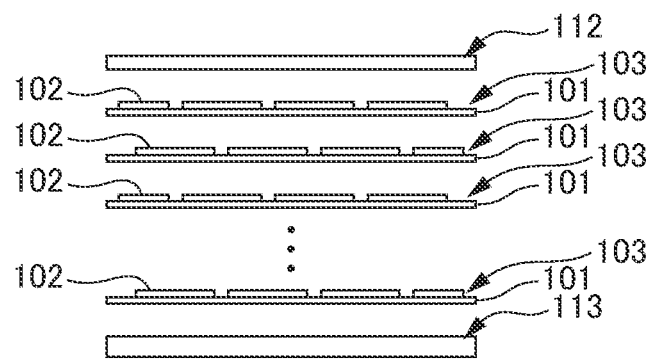
FIG. 7A provides diagrams for explaining a non-limiting example of a method of manufacturing the multilayer ceramic capacitor 1.

Next, in the material sheet laminating step S12, the plurality of material sheets 103 are laminated as shown in FIG. 7A. More specifically, the plurality of material sheets 103 are stacked such that the strip-shaped conductive pastes 102 are directed in the same or substantially the same direction and shifted by half pitch in the width direction W between the adjacent material sheets 103.

Furthermore, the outer layer portion ceramic green sheet 112 defining and functioning as the outer layer portion 12 is stacked on both sides of the plurality of laminated material sheets 103.

Mother Block Forming Step S13

Subsequently, in the mother block forming step S13, the plurality of stacked material sheets 103 and the outer layer portion ceramic green sheet 112 are subjected to thermo-compression bonding. As a result, as shown in FIG. 7B, a mother block 110 is formed.

Mother Block Cutting Step S14

Figure 7B:
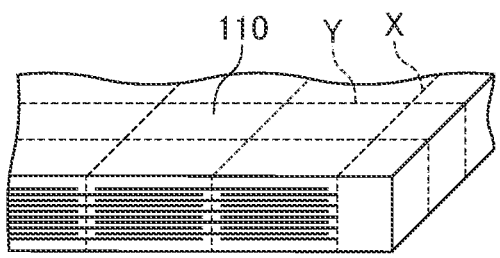
FIG. 7B provides diagrams for explaining a non-limiting example of a method of manufacturing the multilayer ceramic capacitor 1.

Then, in the mother block cutting step S14, the mother block 110 is cut along a cutting line X and a cutting line Y intersecting the cutting line X corresponding to the dimension of the laminate chip 10 as shown in FIG. 7B.

Figure 7C:
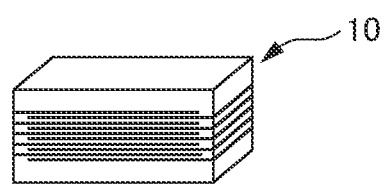
FIG. 7C provides diagrams for explaining a non-limiting example of a method of manufacturing the multilayer ceramic capacitor 1.

As a result, the laminate chip 10 shown in FIG. 7C is manufactured. In the present preferred embodiment, the cutting line Y is perpendicular or substantially perpendicular to the cutting line X.

Side Gap Portion Forming Step S15

Next, a ceramic slurry is prepared which is the same or substantially the same as that of the inner layer ceramic green sheet 101. Then, the ceramic slurry is applied on a resin film, and dried to produce a side gap portion ceramic green sheet.

Figure 7D:
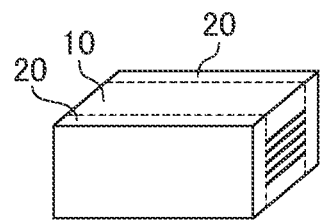
FIG. 7D provides diagrams for explaining a non-limiting example of a method of manufacturing the multilayer ceramic capacitor 1.

Then, the side gap portion ceramic green sheet is affixed on both sides of the laminate chip 10, such that a layer defining and functioning as the side gap portion 20 shown in FIG. 7D is formed.

First Firing Step S16

The layer defining and functioning as the side gap portion 20 is formed in the laminate chip 10, and the resultant body is subjected to degreasing treatment in a nitrogen atmosphere under a predetermined condition, and then fired and sintered at a predetermined temperature in a nitrogen-hydrogen-steam mixed atmosphere to form the multilayer body 2.

External Electrode Forming Step S18

Subsequently, a conductive paste including a conductive metal and glass defining and functioning as the external electrode 3 is applied to the end surface C of the multilayer body 2.

Second Firing Step S19

Then, the resultant body is heated for a predetermined time in a nitrogen atmosphere at a set firing temperature.

Figure 7E:
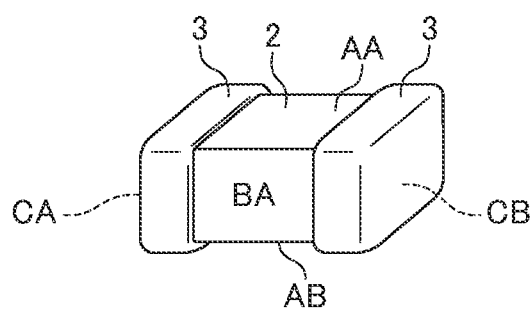
FIG. 7E provides diagrams for explaining a non-limiting example of a method of manufacturing the multilayer ceramic capacitor 1.
Figure 7F:
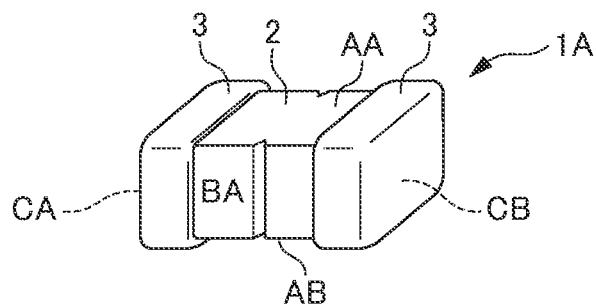
FIG. 7F provides diagrams for explaining a non-limiting example of a method of manufacturing the multilayer ceramic capacitor 1.

Thus, the multilayer ceramic capacitor 1 before the formation of the slit 30 shown in FIG. 7E is manufactured.

Slit Forming Step S20

Then, the external electrode 3 is baked onto the multilayer body 2, and in the present preferred embodiment, the slit 30 having a triangular or substantially triangular cross-section over the entire or substantially the entire dimension in the lamination direction T on the first side surface BA and the second side surface BB is formed in the multilayer ceramic capacitor 1. Thus, the multilayer ceramic capacitor 1 including the slit 30 provided therein is manufactured.

Advantageous Effects

Figure 8:
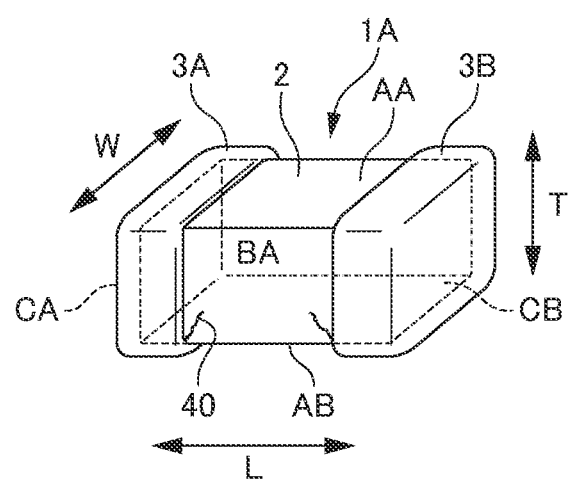
FIG. 8 is a diagram of a comparative example of the multilayer ceramic capacitor 1 in which the slit 30 is not provided.

FIG. 8 is a diagram showing a multilayer ceramic capacitor 1A which is a comparative example in which the slit 30 is not provided, unlike the present preferred embodiment.

Deformation such as expansion and contraction, and deflection may occur in the board on which multilayer ceramic capacitors are mounted, due to shock and heat from the outside. When the board is deformed, the stress due to deformation of the board is transmitted to the solder-mounted multilayer ceramic capacitor 1.

As a result, in the multilayer ceramic capacitor 1A of the comparative example, as shown in FIG. 8, a crack 40 may occur starting from the boundary portion of the external electrode 3 on the second main surface AB and running toward the inside of the multilayer body 2.

However, according to the present preferred embodiment, the slit 30 is provided in at least one of the first side surface BA, the second side surface BB, and the second main surface AB. Therefore, stress is relieved without stress being concentrated on the boundary portion of the external electrode 3 in the second main surface AB. Therefore, the occurrence of the crack 40 starting from the vicinity of the boundary portion of the external electrode 3 in the second main surface AB is reduced or prevented.

Although a preferred embodiment of the present disclosure has been described above, the present invention is not limited to this preferred embodiment, and various modifications can be made within the scope of the gist of the present invention.

For example, in the multilayer ceramic capacitor 1 of the present preferred embodiment, the laminate chip 10 is manufactured followed the side gap portion 20 being attached on both side surfaces. However, the present disclosure is not limited to this, and the side gap portions 20 may be manufactured together at the time of manufacturing the laminate chip 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of dielectric layers and a plurality of internal electrode layers alternately laminated therein, a first main surface and a second main surface opposing each other in a lamination direction, a first end surface and a second end surface opposing each other in a length direction which intersects the lamination direction, and a first side surface and a second side surface opposing each other in a width direction which intersects the lamination direction and the length direction; and
   external electrodes respectively on the first end surface and the second end surface of the multilayer body, and each electrically connected to the internal electrode layers; wherein
   the plurality of internal electrode layers include first internal electrode layers each extending toward the first end surface and second internal electrode layers each extending toward the second end surface;
   the first internal electrode layer closest to the first main surface and the second internal electrode layer closest to the first main surface are opposed to each other in the lamination direction;
   the second internal electrode layer closest to the second main surface and the first internal electrode layer closest to the second main surface are opposed to each other in the lamination direction;
   there are no other electrode layers between the second main surface and the first and second internal electrode layers closest to the second main surface in the lamination direction;
   the plurality of internal electrode layers do not oppose each other in the length direction; and
   the multilayer body includes a slit in at least one of the first side surface, the second side surface, and the second main surface defining and functioning as a board-mounting surface.

2. The multilayer ceramic capacitor according to claim 1, wherein the slit extends over entire dimensions or substantially entire dimensions in the lamination direction of the first side surface and the second side surface.

3. The multilayer ceramic capacitor according to claim 1, wherein the slit is provided at a portion on the first side surface and at a portion on the second side surface in a vicinity of the second main surface in the lamination direction.

4. The multilayer ceramic capacitor according to claim 1, wherein the slit is provided over an entire or substantially an entire length in the width direction of the second main surface.

5. The multilayer ceramic capacitor according to claim 1, wherein the slit is provided at a portion in the width direction of the second main surface.

6. The multilayer ceramic capacitor according to claim 1, wherein a deviation in the lamination direction between end portions of the internal electrode layers in a vicinity of the first side surface and the second side surface is about 0.5 μm or less.

7. The multilayer ceramic capacitor according to claim 1, wherein each of the plurality of dielectric layers is made of a ceramic material including Ba and Ti.

8. The multilayer ceramic capacitor according to claim 1, wherein each of the plurality of internal electrode layers includes Ni.

9. The multilayer ceramic capacitor according to claim 1, wherein each of the plurality of dielectric layers is made of a ceramic material including Ca, Zr, and Ti.

10. The multilayer ceramic capacitor according to claim 1, wherein each of the plurality of internal electrode layers includes Cu.

11. The multilayer ceramic capacitor according to claim 1, wherein each of the external electrodes includes a sintered Cu paste including glass including Ba and silica.

12. The multilayer ceramic capacitor according to claim 1, wherein the slit has a triangular or substantially triangular cross-sectional shape.

13. The multilayer ceramic capacitor according to claim 1, wherein the slit has a semicircular or substantially semicircular cross-sectional shape.

14. The multilayer ceramic capacitor according to claim 1, wherein the slit has a semi-elliptical or substantially semi-elliptical cross-sectional shape.

15. The multilayer ceramic capacitor according to claim 1, wherein the slit has a rectangular or substantially rectangular cross-sectional shape.

\* \* \* \* \*